United States Patent [19]
Mimura et al.

[11] Patent Number: 5,437,490
[45] Date of Patent: Aug. 1, 1995

[54] FINGER MODULE, FINGER MODULE STRUCTURE, AND ROBOT HAND

[75] Inventors: Nobuharu Mimura; Masao Kawase; Akihiko Kanamori; Shinji Naruoka; Osamu Toyama, all of Aichi, Japan

[73] Assignees: Kabushiki Kaisha Toyota Chuo Kenkyusho, Aichi; Toyota Jidosha Kabushiki Kaisha, Toyota; Toyoda Koki Kabushiki Kaisha, Kariya, all of Japan

[21] Appl. No.: 246,468

[22] Filed: May 18, 1994

Related U.S. Application Data

[63] Continuation of Ser. No. 942,453, Sep. 9, 1992, abandoned.

[30] Foreign Application Priority Data

Sep. 14, 1991 [JP] Japan ................... 3-262795

[51] Int. Cl.$^6$ ............................................. B25J 15/10
[52] U.S. Cl. ................... 294/106; 294/907; 901/38; 901/39
[58] Field of Search ............... 294/86.4, 93, 97, 106, 294/111, 907; 318/568.21, 568.16; 414/730, 739; 623/57, 64; 901/23, 25, 26, 32, 34, 37–39, 46

[56] References Cited

U.S. PATENT DOCUMENTS

| | | |
|---|---|---|
| 4,623,183 | 11/1986 | Aomori . |
| 4,653,793 | 3/1987 | Guinot et al. ................... 294/106 X |
| 4,671,732 | 6/1987 | Gorman ........................ 901/37 X |
| 4,821,594 | 4/1989 | Rosheim et al. ............... 294/106 X |
| 4,921,293 | 5/1990 | Ruoff et al. ................... 294/106 X |
| 4,946,380 | 8/1990 | Lee ................................ 294/111 X |
| 5,062,673 | 11/1991 | Mimura . |
| 5,161,846 | 11/1992 | Yakou ........................... 294/106 |

FOREIGN PATENT DOCUMENTS

| | | |
|---|---|---|
| 267696 | 5/1989 | Germany . |
| 62-102982 | 5/1987 | Japan . |
| 62-124891 | 6/1987 | Japan . |
| 62-124892 | 6/1987 | Japan . |
| 1274989 | 11/1989 | Japan . |
| 2279291 | 11/1990 | Japan . |

OTHER PUBLICATIONS

DE-Z Robotersysteme 3 (1987) pp. 167–174, "The Development of a Robot Hand for the Dextrous Manipulation of Objects" by T. J. Doll.

Primary Examiner—Johnny D. Cherry
Attorney, Agent, or Firm—Oblon, Spivak, McClelland, Maier, & Neustadt

[57] ABSTRACT

A finger module includes a first link module rotating around a first joint shaft; first through third drive modules respectively fixed to the first link module and each having an electric motor, reduction means and output means; a second link module driven and rotated by the second drive module; and a third link module driven and rotated by the third drive module. In a finger module structure of the above finger module, the first through third drive modules and the second link module are separately provided in the first link module, and the third link module is provided in the second link module. A robot hand includes at least two of the finger modules side by side.

18 Claims, 9 Drawing Sheets

FINGER MODULE, FINGER MODULE STRUCTURE, AND ROBOT HAND

This application is a continuation of application Ser. No. 07/942,453, filed on Sep. 9, 1992, now abandoned.

BACKGROUND OF THE INVENTION

1. Field of the Invention

This invention relates to human-analogous type fingers and a hand mechanism which can be applied to various operations manually practiced by a human as an alternative mechanism, and more particularly, to human analogous type fingers and hands which can be utilized for end effectors of robots, artificial hands and various manipulators.

2. Description of the Related Art

Conventionally and practically used apparatuses of this kind include end effectors (hands) of an industrial robot, and the structures thereof are mostly such that two pieces of plates are opposed in parallel to each other and operated by a link mechanism and a linear guiding mechanism. When an object to be grasped is known, an end effector in a form suitable to the object is used. When several kinds of objects are to be grasped, exchangeable end effectors are used. The conventional end effector in which the opposed plates are operated by the link mechanism or the like is deficient in general applicability, flexibility and adaptability which are required for a robot. The exchangeable end effector has a structural limitation for enabling the exchange and another limitation that plural end effectors must be provided in the neighborhood of the robot for exchanging the end effector.

On the other hand, there are a five-finger-hand, a three-finger-hand and the like which are in the research and development stages. The main applicable field thereof is an artificial hand, and such hands aim at imitating human hands.

For example, one of such robot hands comprises three fingers arranged in a manner to allow each joint to be moved independently, as disclosed in Japanese Patent Laid-open Publication No. 279291/1990 and U.S. Pat. No. 5,062,673.

Another robot hand, disclosed in Japanese Patent Laid-open Publication No. 274989/1989, has such a structure that a pulley of each joint is independently driven by a wire rope passed through a hose.

An alternative hand is disclosed in Japanese Patent Laid-open Publication No. 124892/1987, in which each finger is composed of plural segments mutually jointed to each other, and each of the segments is engaged with a ball screw carried on an adjacent segment. The ball screw is drivingly coupled with a motor through a power transmission system comprising a worm gear, a pulley and a wire rope.

The examples disclosed in Japanese Patent Laid-open Publication No. 274989/1989 and U.S. Pat. No. 5,062,673 have some disadvantages in that: (1) a load applied to each wire rope is large and the elongation of the wire rope worsens the finger positioning accuracy and the accuracy of strength, and (2) a grasping force by the fingers is small, and the embodiment disclosed in Japanese Patent Laid-open Publication No. 274989/1989 has further disadvantages in that: (3) since the hoses cannot be bent in a small radius of curvature, it is not suitable for a working robot and the wire hoses will cause interference during operation, and (4) frictions between the hoses and the wire ropes are large.

Another example disclosed in Japanese Patent Laid-open Publication No. 124892/1987 has also some disadvantages in that: (1) the structure of a power transmission system is complicated and the power loss is large, (2) since the fingers do not bend even though an external force is applied to the tips of the fingers, such fingers are not applicable in case of grasping fragile objects, and (3) since the correlation between a first finger and a second finger is fixed, the object which can be grasped is limited.

SUMMARY OF THE INVENTION

It is a general object of the present invention to provide an improved robot hand having multi-degrees of freedom realized by the combination of a plurality of functional modules.

It is a more specific object of the present invention to provide an improved robot hand which can be built up by assembling necessary modules in sequence and to make it easy to assemble and disassemble the robot hand.

It is another object of the present invention to provide a robot hand which can stably grasp an object and which allows the object to change its position and posture.

It is still another object of the present invention to eliminate the interference between an object and sensors and simultaneously the interference between a signal cable and a finger as well.

It is a further object of the present invention to provide a finger module comprising any combination of each functional module of the following; a first link module rotating around a first joint shaft provided on a base module; a first drive module having a first drive motor fixed to the first link module for rotating and driving around the first joint shaft, first reduction means for reducing the rotation of the first drive motor and first output means connected to the first link module for giving the output of the reduced rotation; a second drive module having a second drive motor fixed to the first link module, second reduction means for reducing the rotation of the second drive motor and second output means for giving the output of the reduced rotation; a third drive module having a third drive motor fixed to the first link module, third reduction means for reducing the rotation of the third drive motor and third output means for giving the output of the reduced rotation; a second link module driven and rotated around a second joint shaft provided within the first link module by second driven means engaging with the second output means of the second drive module; and a third link module driven and rotated relative to the second link module around a third joint shaft provided within the second link module by third driven means engaging with the third output means of the third drive module.

It is a still further object of the present invention to provide a finger module structure by rotatably supporting the first link module on a base module, providing first, second and third drive modules and a second link module separately within the first link module rotating around a first joint shaft, providing a third link module within the second link module, forming second and third output means of the second and third drive modules by a gear mechanism, and forming second and third driven means of the second and third link modules by gear mechanisms rotatably provided in the first and second link modules respectively.

It is a yet further object of the present invention to provide a robot hand having at least two pieces of the finger modules of the present invention described above and for freely holding an object by a plurality of finger modules.

It is a yet further object of the present invention to provide a finger module having a sensor, disposed within each drive module, for deriving directly a signal from each drive module.

It is a yet further object of the present invention to provide a robot hand comprising a base module and a plurality of finger modules mounted on the base module, wherein each finger module comprises a first link module supported on said base module rotatably around a first joint shaft; a second link module supported on the first link module rotatably around a second joint shaft and perpendicular to a plane including the first joint shaft with respect to a first link module, a third link module supported on the second link module rotatably around a third joint shaft in parallel with the second joint shaft with respect to the second link module, first, second and third drive means provided on the first link module; and first, second and third driving force transmission means for rotating the first, second and third link modules around the respective joint shafts by the driving forces of the first, second and third drive means.

According to the present invention, the rotation of the first drive motor is reduced by the first reduction means to rotate the first link module around the first joint shaft by the first output means. The rotation of the second drive motor is reduced by the second reduction means and transmitted to the driven means of the second link module by the second output means to rotate the second link module around the second joint shaft. The rotation of the third drive motor is reduced by the third reduction means and transmitted to the third driven means of the third link module by the third output means to rotate the third link module around the third joint shaft. By the above-mentioned operation, the finger module of the present invention rotates the first through third link modules around the respective joint shafts only at a predetermined angle. The present invention gives a general effect that an articulated multi-degree of freedom can be easily realized by any arbitrary combinations of the three type functional modules.

According to the finger module structure of the present invention, since the first link module is provided to the base module, the first, second and third drive modules are separately provided within the first link module, and the second and third link modules are provided separately from each other so as to set both of the output means of each drive means and the driven means of each link means as the gear mechanism, the present invention gives a more specific effect that the assembly and disassembly of each module can be practiced independently and therefore, can be done easily and within a short period of time.

Since the robot hand of the present invention is at least a three-joint and two finger-robot hand, there are some other effects that the present invention makes a three-finger-joint structure possible, makes a stable grasping possible, makes any arbitrary finger-and-joint arrangements possible, further allows a grasped object to change its position and posture, and makes the adaptability to environments higher due to the flexibility.

According to the finger module of the present invention, since some sensors required for the finger control are disposed to each drive module and the control of each degree of freedom is made possible by deriving the output signal detected by each sensor directly from each drive module, there is no need to provide a sensor within the link module for leading out the resulting signal, there is no interference between the object and the sensor, and no signal cable passes through the link module. Therefore, the present invention has an effect that the resulting reliability is high.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
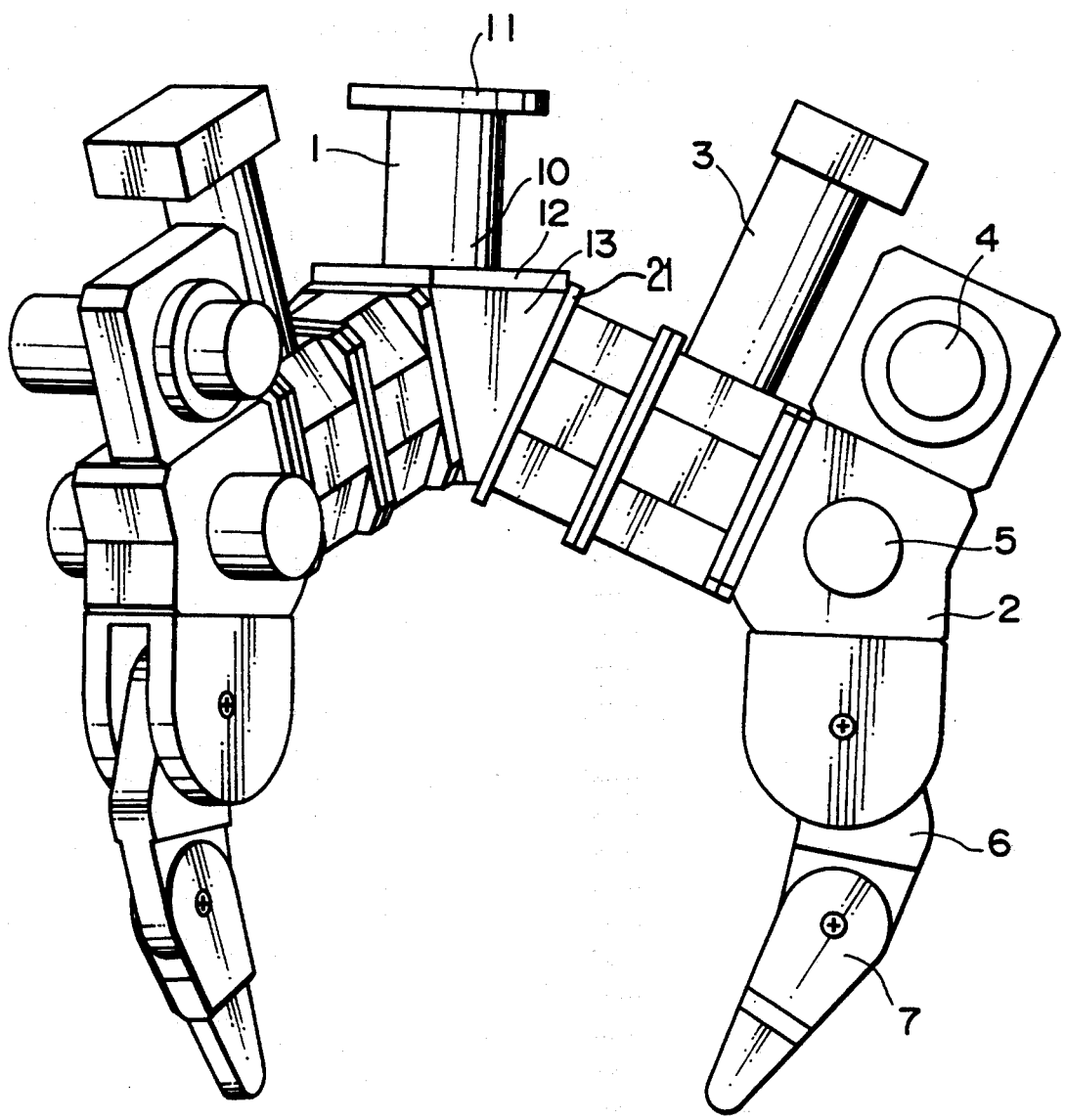
FIG. 1 is a perspective view showing an external appearance of a robot hand according to a first preferred embodiment of the present invention.
Figure 2:
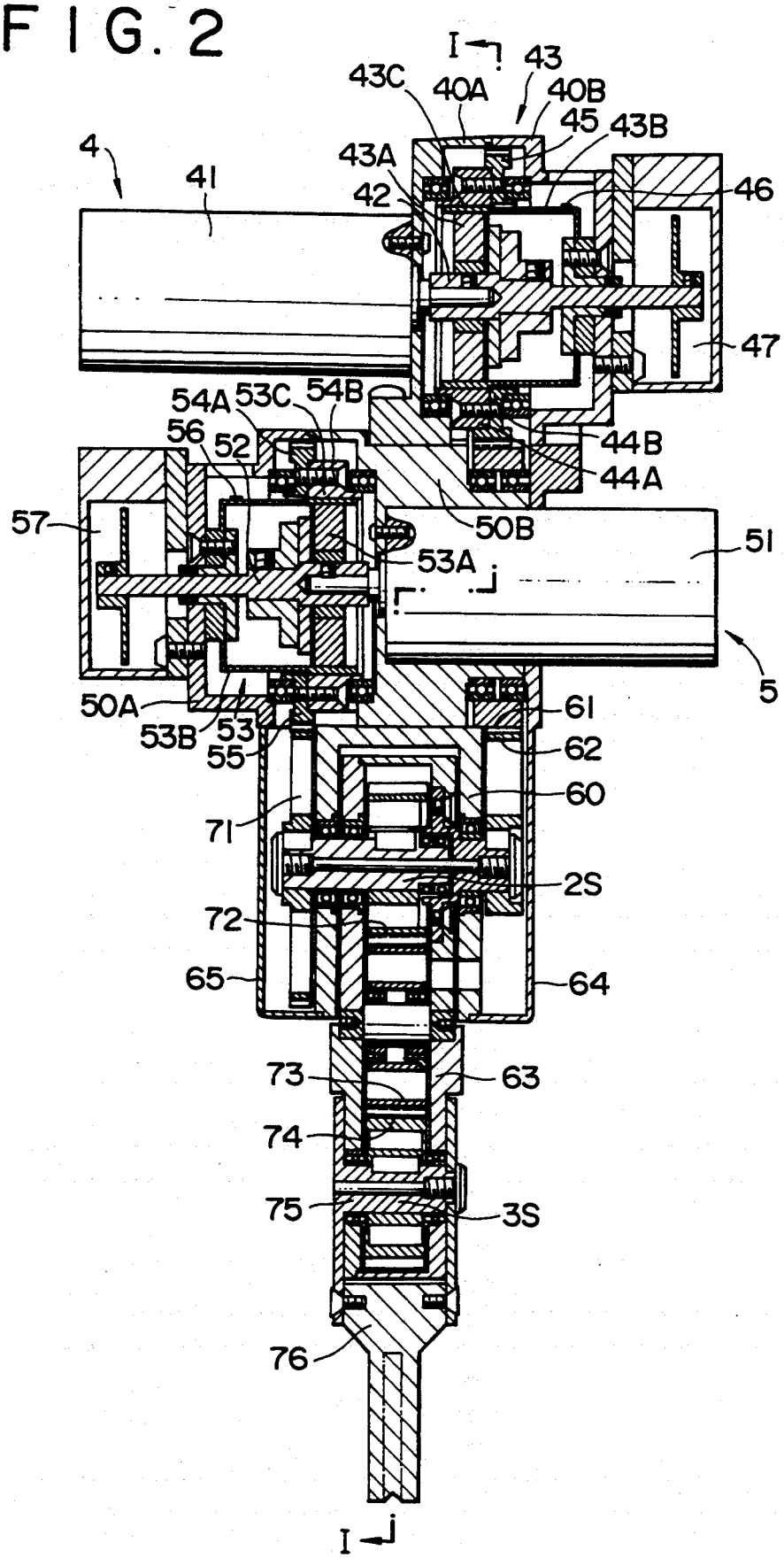
FIG. 2 is a longitudinal cross-sectional view showing a finger module according to the first preferred embodiment.
Figure 3:
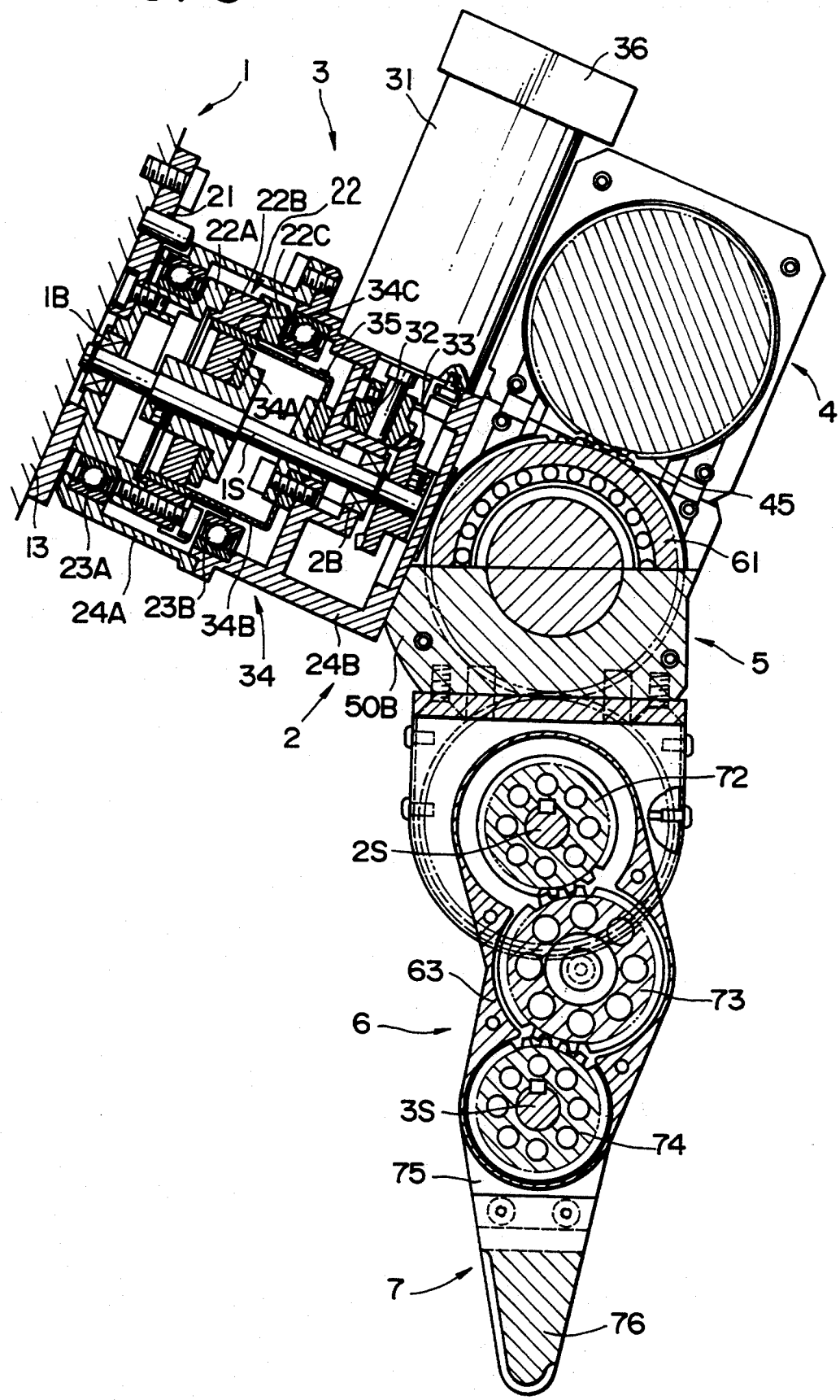
FIG. 3 is a sectional view taken along a chain line I—I of FIG. 2 showing the finger module according to the first preferred embodiment of the present invention.

Referring now to FIGS. 1 through 3, the detailed description of a robot hand will be given as a first preferred embodiment of the present invention.

EMBODIMENT 1

A robot hand in the first preferred embodiment comprises a combination of three pieces of finger modules (only two pieces are shown in FIG. 1) which are attached to a base module at an interval of 120°, e.g., and each finger module has three joints as shown in FIG. 1.

As shown in FIGS. 1 through 3, the finger module according to the first preferred embodiment comprises a first link module 2, a first drive module 3, a second drive module 4, a third drive module 5, a second link module 6 and a third link module 7.

The first link module 2 rotates around a first joint shaft 1S pivoted by a member fixed to the base module 1. The first drive module 3 includes a first drive motor 31 for rotating and driving the first joint shaft 1S fixed to the first link module 2, first reduction means 34 for reducing the rotation of the first drive motor 31 by a harmonic drive reduction mechanism, and first output means 34B connected to the first link module 2 for giving the output of the reduced rotation. The second drive module 4 includes a second drive motor 41 fixed to the first link module 2 perpendicularly to the first joint shaft 1S, second reduction means 43 for reducing the rotation of the second drive motor 41 by a known harmonic drive reduction mechanism, and second output means 45 of a gear mechanism for giving the output of the reduced rotation. The third drive module 5 includes a third drive motor 51 fixed to the first link module 2 in parallel to the second drive motor, third reduction means 53 for reducing the rotation of the third drive motor 51 by a harmonic drive reduction mechanism, and third output means 53 of a gear mechanism for giving the output of the reduced rotation. The second link module 6 comprises a second link member 63 rotated and driven around a second joint shaft 2S, which is perpendicular to the first joint shaft 1S, by second driven means 61 comprising a gear mechanism engaging with the gear mechanism of the second output means of the second drive module 4. The third link module 7 is provided with a holding tool 76 rotated and driven relatively to the second link module 6 around a third joint shaft 3S, which is in parallel to the second joint shaft 2S, by third driven means 71 comprising a gear mechanism engaging with the gear mechanism of the third output means of the third drive module.

As shown in FIG. 1, the base module 1 comprises a cylindrical base 10 having flange portions 11 and 12 at both ends, a mounting portion 13 of a triangular truncated cone formed below the lower flange 12 of the cylindrical base 10 and flange portion 21 fixed to the mounting portion 13 and inserted within the first link module, and each finger module is fixed to three inclined faces at an approximate angle of 20° with respect to the perpendicular of the mounting portion 13.

As shown in FIG. 3, the first link module 2 is a member having a roughly V-letter shape and including a step-like annular member 22 (22A, 22B and 22C) fixed to the flange portion 21 and divided into three parts in an axial direction, the first joint shaft 1S pivoted by a bearing 1B at the left end of the annular member 22, outer cases 24A and 24B of axially divided hollow cylindrical members with the bottom, which are disposed to be relatively rotatable through two bearings 23A and 23B provided on the outside wall of the annular member 22, outer cases 40A, 40B, 50A and 50B, an inner case 60 and left and right covers 64 and 65, which will be described later.

As shown in FIG. 3, the first drive module 3 includes the first drive motor 31, a second bevel gear 33 and a harmonic drive reduction mechanism 34. The first drive motor 31 is constructed by an electric motor fixed in a rectangular relation to the outside wall of the upper part of the outer case 24B at the outside of the first link module. The second bevel gear 33 is fixed to the right end of the first joint shaft 1S, to which a rotating torque is transmitted by a first bevel gear 32 of a small diameter formed at the tip of the rotating shaft of the first drive motor 31 by piercing through the outer case 24B, in engagement with this bevel gear 32. The harmonic drive reduction mechanism 34 is constructed by an elliptical wave generator 34A in cross section fixed to the first joint shaft 1S through a T-letter shaped member, a flexible spline 34B, which is a thin hollow cylindrical member having the bottom fixed to the outer case 24B for relatively and rotatably pivoting the first joint shaft 1S by a bearing 2B, and brought into contact with the wave generator 34A, and a circular spline 34C formed on the inside wall of the annular member 22B of the first link module 2 and engaging with the flexible spline 34B. Since the circular spline 34C is fixed, the output torque of the wave generator 34A acts on the outer cases 24A and 24B constructing the output means through the flexible spline 34B, and by the resulting reaction, the flexible spline 34B and the outer cases 24A and 24B rotate relatively to the circular spline 34C.

The first drive module 3 makes it possible to detect any torque by providing a plurality of strain gauges 35 at a portion close to the fixed end of the outside wall of the flexible spline 34B and also makes it possible to detect any output shaft rotational angle by providing a rotational angle sensor 36 constructed by an optical telemeter at the upper end of the electric motor of the drive motor 31.

As shown in FIG. 2, the second drive module 4 includes the second drive motor 41 and a harmonic drive reduction mechanism 43. The second drive motor 41 is constructed by an electric motor fixed in a rectangular relation with the first joint shaft 1S to the outer case 40A in the left part of the drawing of the axially divided outer cases 40A and 40B fixed to the upper portion of the right outer case 50B fixed to the outer case 24B of the first link module 2. The harmonic drive reduction mechanism 43 is constructed by an elliptical wave generator 43A in cross section fixed to a rotating shaft 42 of the second drive motor, a flexible spline 43B, which is a thin hollow cylindrical member fixed to the bottom of the outer case 40B in the right part of the drawing and brought into contact with the wave generator 43A, and a circular spline 43C formed on the inside wall of an annular member 44A in the left part of the drawing of axially divided annular members 44A and 44B, which are pivoted by left and right bearings to the outer cases 40A and 40B, and engaging with the flexible spline 43B. Since the flexible spline 43B is fixed to the outer case, an annular gear formed integrally with the circular spline 43C pivoted to the outer case is set as output means 45.

The second drive module 4 makes it possible to detect any torque by providing a plurality of strain detectors 46 at a portion close to the fixed end of the outside wall of the flexible spline 43B and also makes it possible to detect any output rotational angle by providing a rotational angle sensor 47 at the right end of the drawing of the outer case 40B.

As shown in FIG. 2, the third drive module 5 includes the third drive motor 51, a harmonic drive reduction mechanism 53 and third output means 55 of a gear. The third drive motor 51 is constructed by an electric motor fixed in parallel with the second drive motor to the right outer case 50B integrally fixed to the outer case 24B of the first link module 2. The harmonic drive reduction mechanism 53 includes an elliptical wave generator 53A in cross section fixed to a rotating shaft 52 of the third drive motor, a flexible spline 53B, which is a thin cylinder having the bottom at the right end fixed to the hollow cylindrical left outer case 50A having the bottom and fixed to the right outer case 50B, and brought into contact with the wave generator 53A, and a circular spline 53C formed on the inside wall of a right member 54B of axially divided annular members 54A and 54B, which are pivoted to the left and right outer cases 50A and 50B respectively through bearings, and engaging with the flexible spline 53B. The third output means 55 of a gear is formed by chasing gear teeth on the external periphery of the left member 54A integrated with the right member 54B.

The third drive module 5 makes it possible to detect any torque by providing a plurality of strain gauges 56 on the outside wall close to the fixed end of the flexible spline 53B fixed to the left outer case 50A and also makes it possible to detect the rotational angle of the rotating shaft of the drive motor 51 by providing a rotational angle sensor 57 on the left bottom wall of each of the left and right outer cases.

As shown in FIGS. 2 and 3, the second module 6 includes second driven means 61, 62 and a second link member 63 in a V-letter form. The second driven means 61, 62 are constructed by a first input gear 61 provided in the circumference of a bearing arranged in an annular form to the right outer case 50B attached with the third drive motor 51, and engaging with a gear 45 which is the output means of the second drive module 4, and a second input gear 62 comprising a semicircular gear formed in the right end part of the drawing of the second joint shaft 2S pivoted by a U-shaped inner case 60 in vertical cross section fixed to the right outer case 50B of the third drive module fixed to the first link module, and engaging with the first input gear 61. The second link member 63 is integrated with the second input gear and pivoted by each bearing to the inner case 60 and the second joint shaft.

A right cover 64 fixed to the inner case 60 and the right outer case 50B so as to cover the right side thereof and a left cover 65 fixed to the inner case 60 and the left outer case 50A so as to cover the left side thereof are components of the first link module.

As shown in FIGS. 2 and 3, the third link module 7 includes an input gear 71, a first intermediate gear 72, a second intermediate gear 73, a third intermediate gear 74, a first link member 75 in an H-letter form in vertical cross section and a second link member 76. The first input gear 71 is provided within the left cover of the second link module in the left end part of the drawing of the second joint shaft formed in the first link module and engaging with a gear 55 which is the third output means of the third drive module. The first intermediate gear 72 is provided within the inner case 60 of the second link module 6 integrally rotating with the input gear 71 integrated with the second joint shaft. The second intermediate gear 73 is pivoted to the second link member 62 through a bearing and engaging with the first intermediate gear 72. The third intermediate gear 74 is pivoted to the second link member 62 through a bearing and integrated with the third joint shaft 3S engaging with the second intermediate gear. The first link member 75 is integrally fixed to the right end part of the drawing of the third joint shaft. The second link member 76 defines a holding tool in a roughly Y-letter form in vertical cross section fixed by flush head screws from both sides of the side wall at the lower end of the first link member.

The overall operation for the robot hand having the above construction in the first preferred embodiment is as follows.

The rotation of the first drive module 3 is reduced by the harmonic drive reduction mechanism 34 accordingly as the rotation of the first drive motor 31, and the outer cases 24A and 24B constructing the first link module 2 is rotated at reduced revolution relatively to the base module 1.

The rotation of the second drive motor 41 fixed to the right outer case 50B constructing the first link module 2 rotating relatively to the base module is reduced by the harmonic drive reduction mechanism 43 to rotate the annular gear 45 formed integrally with the circular spline 43C. This rotation is transmitted from the first input gear 61 surrounding the third drive motor to the semicircular second input gear 62 formed integrally with the second link member, and therefore, the second drive module 4 rotates the second link member 62 constructing the second link module 6 in accordance with each command inputted to the second drive motor 41.

The rotation of the third drive motor 51 fixed to the right outer case 50B constructing the first link module is reduced by the harmonic drive reduction mechanism 43 to rotate the gear 55 formed integrally with the circular spline 53C, and the third drive module 5 rotates the first and second link members 75 and 76 constructing the third link module 7 through the input gear 71 formed in the second joint shaft 2S, the first, second and third intermediate gears 72, 73 and 74 in accordance with each command inputted to the third drive motor 51.

At this time, each rotating torque and each rotational angle are detected by the strain detectors 35, 46 and 56 and the rotational angle sensors 36, 47 and 57 mounted on the respective drive modules 3, 4 and 5 provided in the first link module 2, and a signal is directly led out from each of the drive modules 3, 4 and 5.

The overall effects by the first preferred embodiment are as follows.

The finger module of the first preferred embodiment having the above-mentioned structure comprises any combination of one piece of the base module 1, three pieces of the drive modules 3, 4 and 5 and three pieces of the link modules 2, 6 and 7, and attains such effects that the shape, motion and function analogous to human fingers can be realized and an articulated multi-degree of freedom can be realized easily at will in accordance with any objects and environments.

The finger module structure of the first preferred embodiment is structural such that each finger module is independent while setting the base module 1 as a base and any necessary members are additionally provided to each module. Since any complicated members can be provided to each module as a separate structure, there are some advantages in that each functional module can be assembled or disassembled independently or concurrently, and each functional module can be attached or detached and repaired or exchanged rapidly and easily. Furthermore, since the number and arrangement of joints can be varied easily at will, there is an effect that the degree of freedom is high and the practicability is also high. In case there are any failures, only the defective module or parts can be replaced, and therefore, there is an operative effect that the number to be repaired and the time required for repairing are largely shortened in addition to the easiness in repairing.

Since the robot hand in the first preferred embodiment of the present invention is a three-finger and nine-joint robot hand, a stable holding is possible as a hand, a position and attitude of a grasped object can be varied and the practicability of the robot hand can be enhanced. Therefore, there is an effect that the robot hand is flexible and the adaptability to any environment is also high.

There is another effect that the robot hand in the first preferred embodiment can be easily constructed as a hand with different shapes, numbers and arrangements by arbitrarily varying the base module from the triangular truncated cone shape. Furthermore, there is another operative effect that a small content and a large reduction ratio are attained by the use of a harmonic drive reduction gear.

Furthermore, in the robot hand of the first preferred embodiment, the rotations of the second and third link modules of each finger module around the second and third rotating shafts accomplish the bending motion of each finger within each plane, and the motion of the first module around the first joint shaft inclined to the mounting face for the base module rotates each plane where the bending motion is conducted. The tip of the third link module corresponding to a finger tip can be displaced thereby in a clamp direction (i.e. radial direction) and a direction perpendicular to the clamp direction, and such a high grade operation as clamping and turning the head of a bolt can be conducted.

Since the drive means for driving the second and third link modules are provided on the first link module, the construction of the second and third link modules can be arranged in a shape without any projections, and therefore, any interference between mutual fingers can be prevented.

The method for detecting and leading out the finger module signal in the first preferred embodiment can be based on the signal detected and led out from any stationary members fixed to the first link module of each drive module provided in the first link module. Therefore, this method makes it possible to control torque, stiffness or the like for each degree of freedom and makes the correction, exchange and repair of the sensor easy. There is no need to use any slip rings nor to detect and lead out any signals through the link module. Consequently, this method gives a further effect that the method is highly reliable and simple.

EMBODIMENT 2

Figure 4:
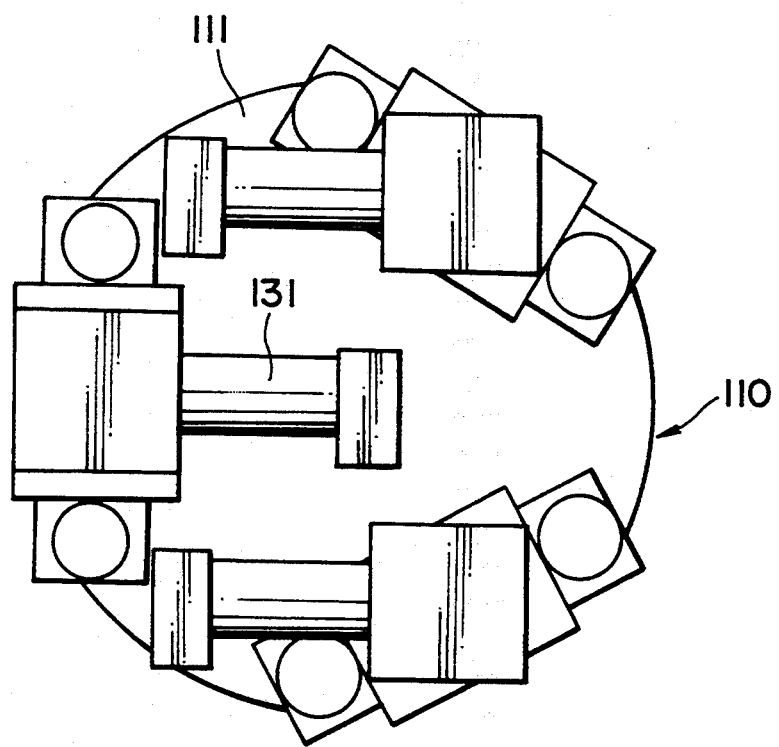
FIG. 4 is a view showing the layout of each finger module of a robot hand according to a second preferred embodiment of the present invention.
Figure 5:
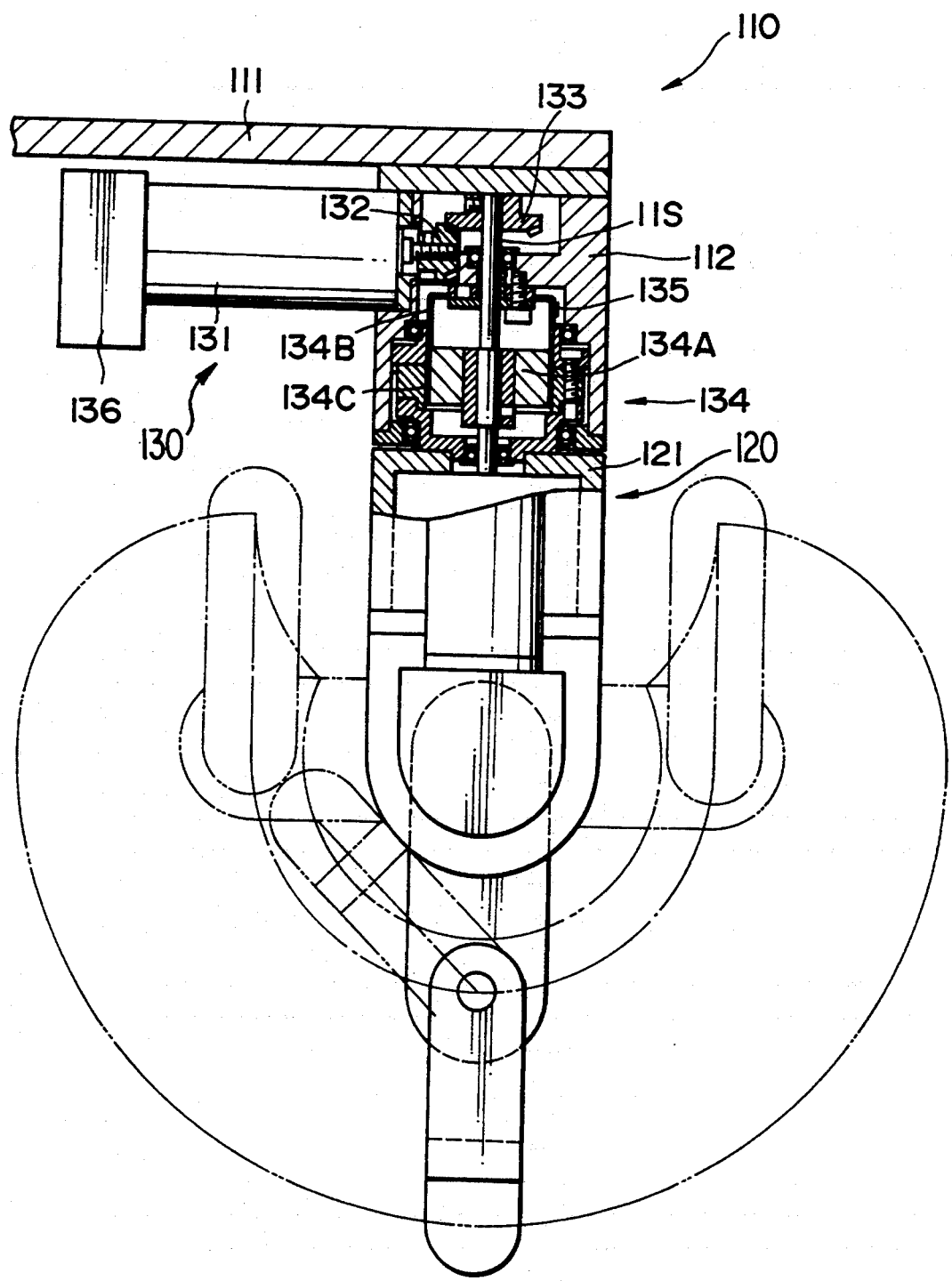
FIG. 5 is a longitudinal cross-sectional view showing a first drive module of a finger module according to the second preferred embodiment of the present invention.
Figure 6:
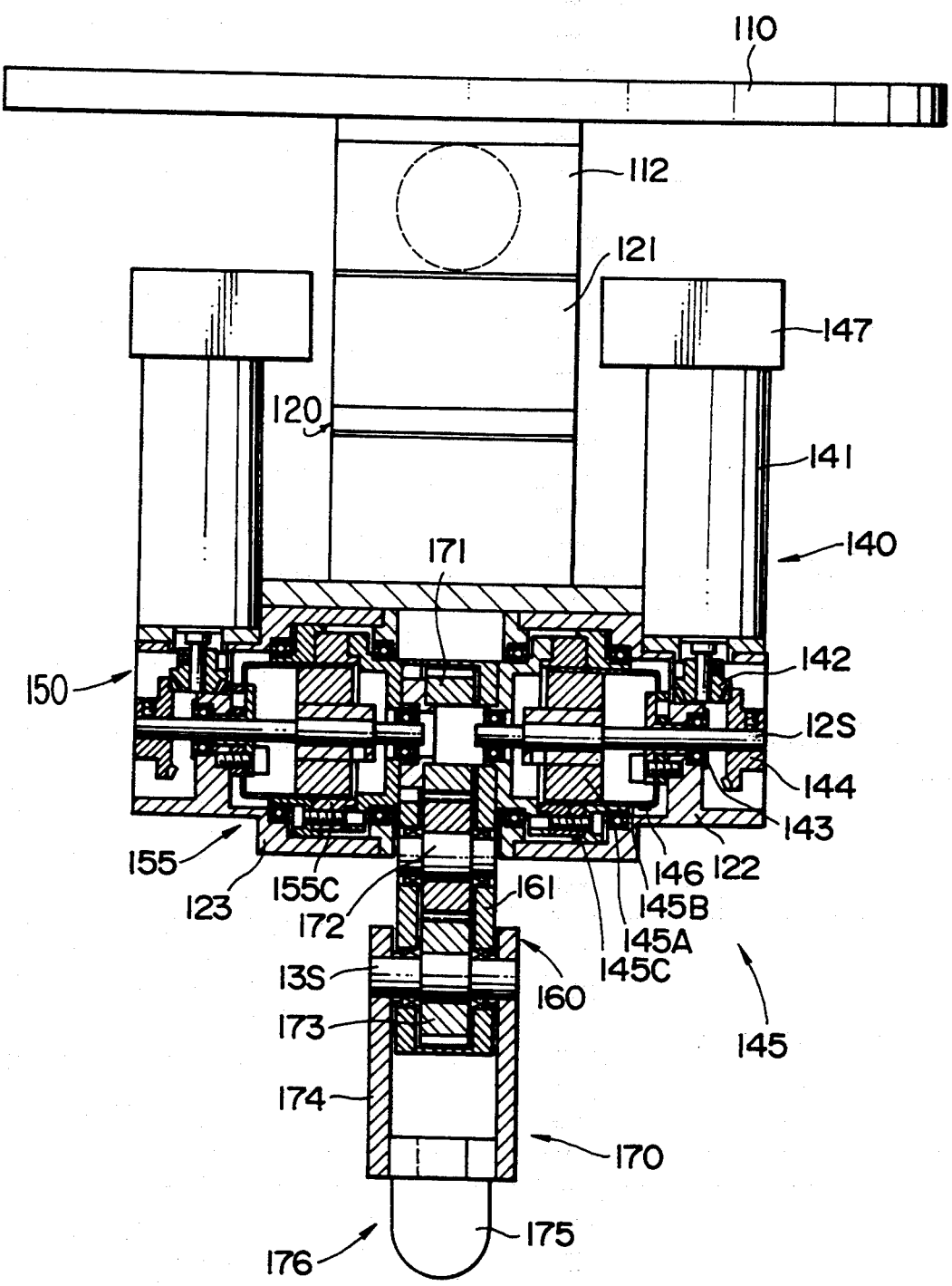
FIG. 6 is a longitudinal cross-sectional view showing a finger module according to the second preferred embodiment of the present invention.

Referring now to FIGS. 4 through 6, the representative construction of an apparatus in a second preferred embodiment of the present invention will be described with the emphasis on the differences from the first preferred embodiment.

A robot hand in the second preferred embodiment comprises three pieces of finger modules provided at an interval of 120° on a suspended circular base 111 constructing a base module as shown in FIG. 4.

In each finger module of the second preferred embodiment, a base module 110 comprises a circular base 111 as shown in FIGS. 4 and 5, and a post 112 suspended at an interval of 120° on the underside part in FIG. 5.

A first drive module 130 includes an electric motor 131, a bevel gear 133, a harmonic drive reduction mechanism 134, a strain detector 135 and a rotation detector 136. The electric motor 131 is fixed at a right angle to the side wall of the post 112 of the circular base 111. The bevel gear 133 is fixed to the upper end of a first joint shaft 11S formed on the co-axis within the post 112 engaging with a bevel gear 132 fixed to the rotating shaft of the electric motor 131. The harmonic drive reduction mechanism 134 is constructed by a wave generator 134A fixed to the first joint shaft 11S, a flexible spline 134B fixed to the post 112, and a circular spline 134C engaging with the flexible spline 134B pivoted to the post 112. The strain detector 135 is provided on the side wall of the flexible spline 134B, and the rotation detector 136 is provided in the left end part of FIG. 5 of the electric motor 131.

As shown in FIGS. 5 and 6, a first link module 120 is a reversed T-letter shaped member provided at the lower portion of the post 112 and comprising a first link member 121 pivoted to the first joint shaft 11S and integrally fixed to the circular spline 134C.

A second drive module 140 includes an electric motor 141, a bevel gear 144, a harmonic drive reduction mechanism 145, a strain detector 146 and a rotation detector 147. The electric motor 141 is perpendicularly provided on the right end portion 122 of the first link member 121 shown in FIG. 6. The bevel gear 144 is fixed to the right end of a rotating shaft 143 constructing a second joint shaft 12S pivoted to the right end 122 and a center portion and is engaged with a bevel gear 142 fixed to the rotating shaft of the electric motor 141. The harmonic drive reduction mechanism 145 is constructed by a wave generator 145A fixed to the rotating shaft 143, a flexible spline 145B brought into contact with the wave generator 145A fixed to the right end 122 of the first link member 121, and a circular spline 145C integrally formed with a second link module 160, which will be described later, engaging with the flexible spline 145B and pivoted to the right end 122. The strain detector 146 is provided on the side wall of the flexible spline 145B, and the rotation detector 147 is provided at the upper end of the electric motor 141.

A third drive module 150 has the similar construction to that of the second drive module except that the third drive module 150 is provided at the left end 123 of the first link member 121 shown in FIG. 6 and a circular spline 155C in a harmonic drive reduction mechanism 155 is integrally formed with an input gear 171 of a third link module 170 which will be described later. Therefore, the detailed description of the third drive module is omitted herein.

A second link module 160 is integrally formed with the circular spline 145C in the second drive module 140, and constructed by a second link member 161 rotating around the second joint shaft 12S relatively to the first link module.

A third link module 170 includes an input gear 171 pivoted within the second link member 161 and integrally rotating with the circular spline 155C of the third drive module, a second intermediate gear 173 rotatable about shaft 135 and engaging with a first intermediate gear 172 engaging with the input gear 171 pivoted within the second link member 161, and a third link member 176 constructing a first member 174 fixed to both ends of the second intermediate gear 173 and a second member 175 constructing a holding tool fixed to the tip of the first member 174. The shaft 135 is mounted on the first member 174.

The overall operation of the robot hand in the second preferred embodiment of the above-mentioned construction is similar to that of the first preferred embodiment. The second and third link members 161 and 176 rotate while drawing loci as indicated by a chain line and a double chain line in FIG. 5, respectively.

The robot hand in the second preferred embodiment having the overall operation described above gives the similar effects to those of the first preferred embodiment except that the first link module rotates around the first joint shaft perpendicularly to the mounting face of the base module. As apparent from the locus indicated by a double chain line in FIG. 5, the robot hand enables the conduction of a symmetrical work to the inside and outside, the structure is simplified since the second link member is not provided with the gear mechanism in the first preferred embodiment, and the assembly, disassembly and repair become much easier.

EMBODIMENT 3

Figure 7:
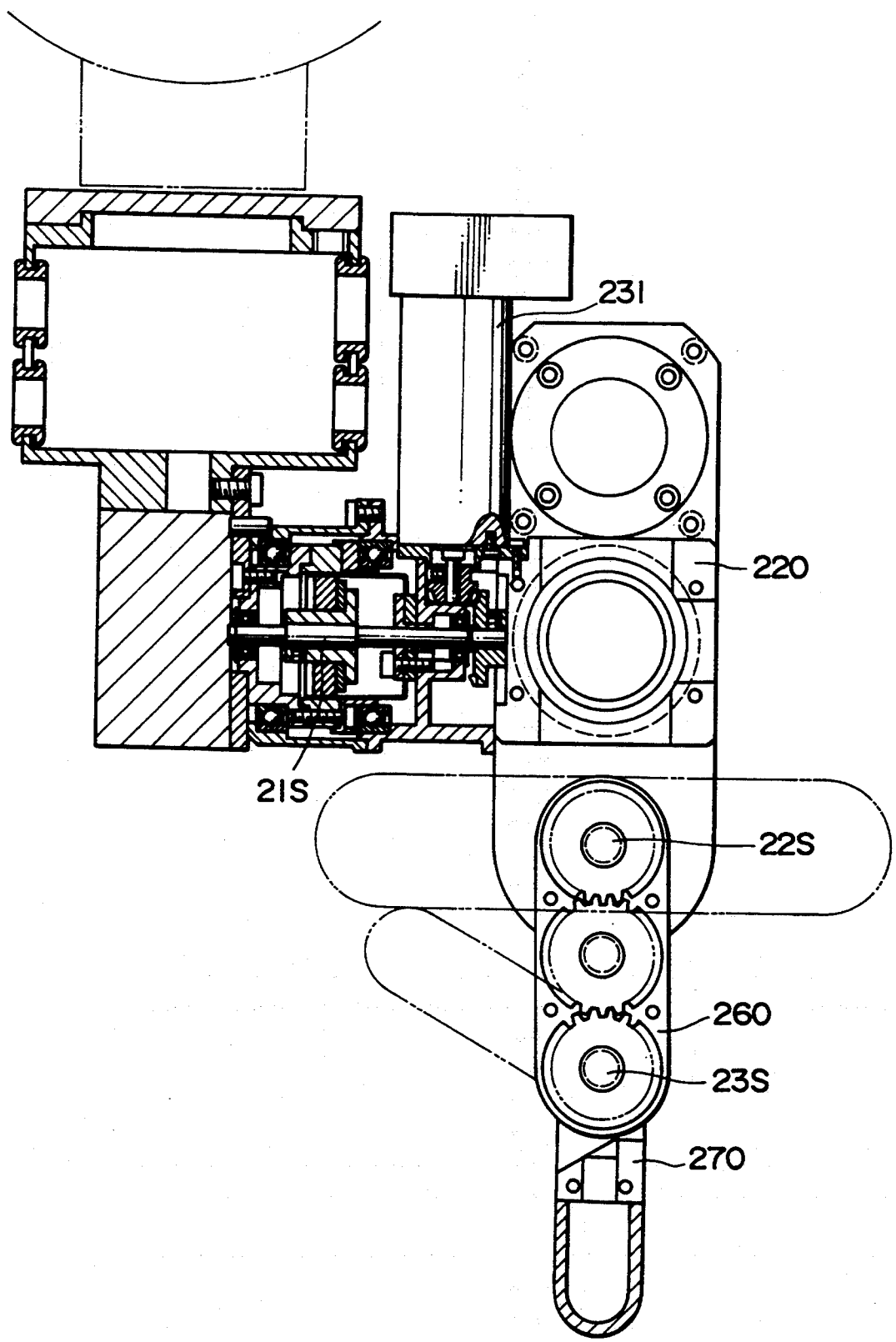
FIG. 7 is a partial cut-out view showing an external appearance of a finger module according to a third preferred embodiment of the present invention.
Figure 8:
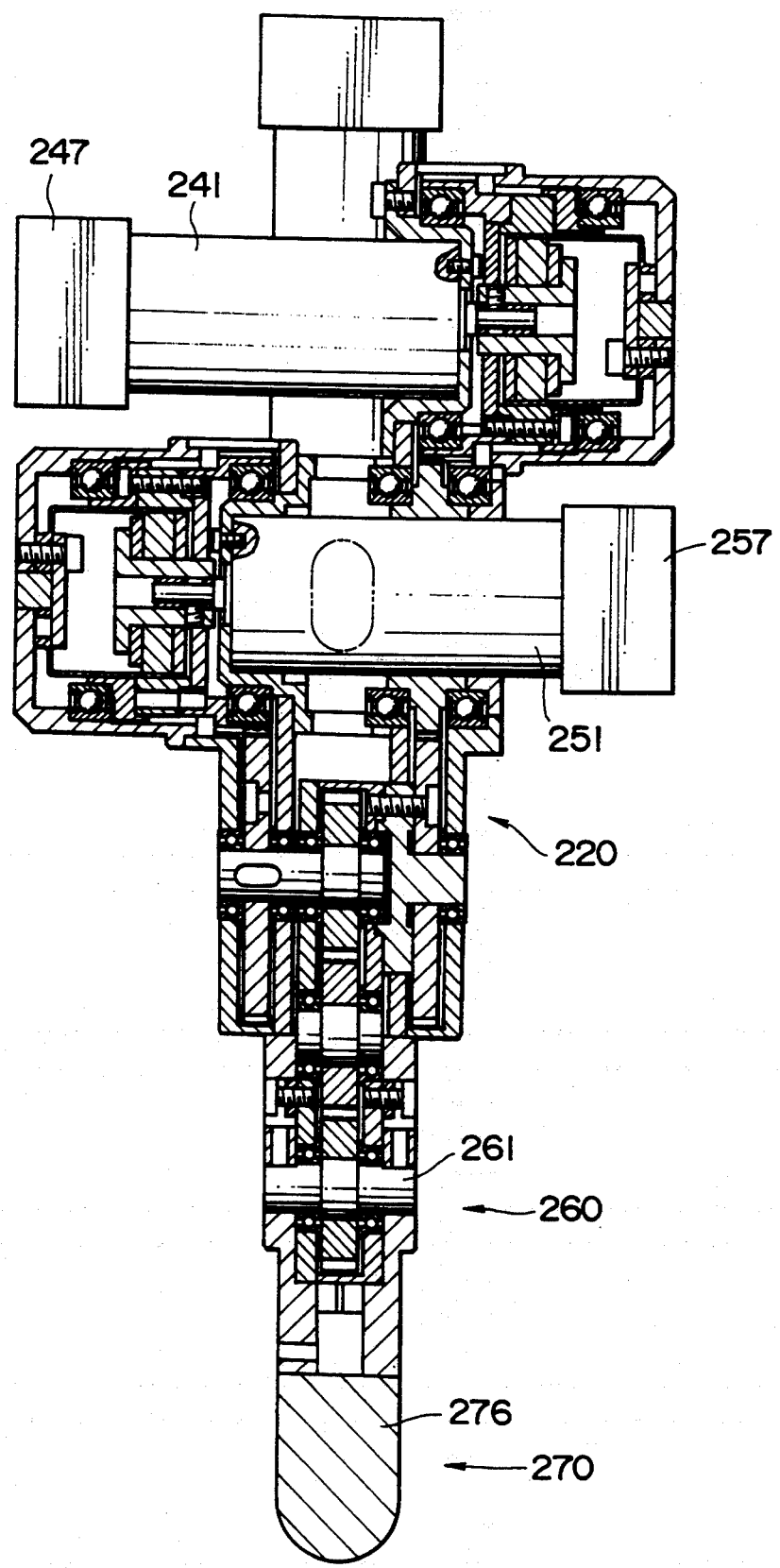
FIG. 8 is a longitudinal sectional view showing the finger module according to the third preferred embodiment of the present invention.

Referring now to FIGS. 7 and 8, a robot hand of a third preferred embodiment will be explained with the emphasis on only the difference between this preferred embodiment and the above-mentioned embodiments.

The robot hand in the third preferred embodiment has a construction by combining each technical idea with each construction for accomplishing the technical idea between the first and second preferred embodiments as shown in FIGS. 7 and 8. These main differences are as follows; first, second and third link modules 220, 260 and 270 are all constructed by simple and straight members; and an electric motor 231 in the first drive module is perpendicularly provided by setting a first joint shaft 21S horizontally, and rotation detectors 247 and 257 set in the second and third drive modules are all provided to the opened end portions of electric motors 241 and 251. The rotatable positions of second and third link members 261 and 276 enable the conduction of symmetrical motions internally or externally as indicated by a double chain line in FIG. 7 similar to those of the second preferred embodiment. Other operative effects are also similar to those of the preceding preferred embodiments, except that the first link module rotates around the first joint shaft horizontal to the mounting face of the base module.

Figure 9:
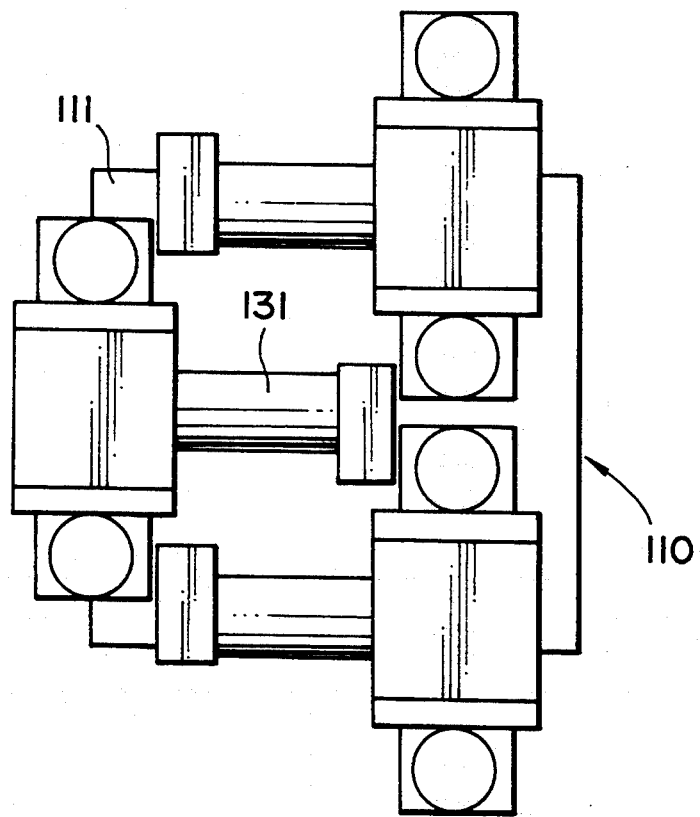
FIG. 9 is a view showing another layout of a finger module to a base module.

In the second preferred embodiment described above, the arrangement mode of each finger module to the base module 110 shown in FIG. 4 has been described as an embodiment, but the present invention can adapt other arrangement modes as shown in FIG. 9 for providing the electric motors or the like in parallel with each other.

The preferred embodiments of the present invention, as herein disclosed, are taken as some embodiments for explaining the present invention. It is to be understood that the present invention should not be restricted by these embodiments and any modifications and additions are possible so far as they are not beyond the technical idea or principle based on descriptions of the scope of the patent claims.

What is claimed is:

1. A finger module comprising:
   a first link module rotating around a first joint shaft provided on a base module;
   a first drive module having a first drive motor fixed to the first link module for driving and rotating the first link module around the first joint shaft, first reduction means for reducing a rotation of the first drive motor, and first output means connected to the first link module for outputting the reduced rotation of said first drive motor;
   a second drive module having a second drive motor fixed to the first link module, second reduction means for reducing a rotation of the second drive motor, and second output means for outputting the reduced rotation of said second drive motor;
   a third drive module having a third drive motor fixed to the first link module, third reduction means for reducing a rotation of the third drive motor, and third output means for outputting the reduced rotation of said third drive motor;
   a second link module driven and rotated around a second joint shaft provided in the first link module by second driven means engaging with the second output means of the second drive module; and
   a third link module driven and rotated around a third joint shaft provided in the second link module by third driven means engaging with the third output means of the third drive module, wherein all of said link modules are driven and rotated through gear means by said drive modules.

2. A finger module according to claim 1, further comprising:
   a sensor disposed in each drive module, wherein each of said reduction means of each of said drive modules comprises a differential type gear means.

3. A finger module according to claim 2, wherein:
   said sensor comprises a strain gauge provided in said reduction means of each drive module for detecting any tongue acting on said reduction means.

4. A finger module according to claim 2, wherein:
   said sensor comprises a rotational angle sensor which detects a rotational angle of the drive motor of each drive module.

5. A finger module structure comprising:
   a first link module rotating around a first joint shaft provided on a base module;
   a first drive module having a first drive motor fixed to the first link module for driving and rotating the first link module around the first joint shaft, first reduction means for reducing a rotation of the first drive motor, and first output means connected to the first link module for outputting the reduced rotation of said first drive motor;
   a second drive module having a second drive motor fixed to the first link module, second reduction means for reducing a rotation of the second drive motor, and second output means for outputting the reduced rotation of said second drive motor;
   a third drive module having a third drive motor fixed to the first link module, third reduction means for reducing a rotation of the third drive motor, and third output means for outputting the reduced rotation of said third drive motor;
   a second link module driven and rotated around a second joint shaft provided in the first link module by second driven means engaging with the second output means of the second drive module; and
   a third link module driven and rotated around a third joint shaft provided in the second link module by third driven means engaging with the third output means of the third drive module, and wherein
   the first link module is rotatably supported on said base module; and
   the first, second and third drive modules and the second link module are separately provided on the first link module rotating around the first joint shaft;
   the third link module is provided on the second link module;
   the second and third output means of the second and third drive modules respectively comprise first gear means; and
   the second and third driven means of the second and third link modules comprise second gear means and are rotatably provided on the first and second link modules, respectively;
   wherein an outer peripheral wall of each of said driven means is engaged with an outer peripheral wall of each said output means of each of said drive modules.

6. A finger module structure according to claim 5, wherein:
   at least one of the reduction means of said first, second and third drive modules comprises:

a first small-diameter bevel gear passing through an outer case and formed at a tip of a rotating shaft of the first drive motor;

a second bevel gear engaging with the first bevel gear and fixed to a right end of the first joint shaft, to which a rotational torque is transmitted;

a wave generator elliptical in cross section fixed to the first joint shaft through a T-shaped member;

a flexible spline, which is a thin hollow cylindrical member having a bottom fixed to the outer case for pivoting the first joint shaft and allowing a relative rotation by a bearing, said flexible spline contacting the wave generator; and a circular spline formed on an inner side wall of an annular member of the first link module and engaging with the flexible spline.

7. A finger module structure according to claim 5, wherein:

at least one of the reduction means of said first, second and third drive modules comprises:

a wave generator elliptical in cross section and fixed to a rotating shaft of the second drive motor;

a flexible spline, which is a thin hollow cylindrical member having a bottom fixed to an outer case, and contacting with the wave generator; and a circular spline engaging with the flexible spline and formed on an inner side wall on one of axially divided annular members which are pivoted by two left and right bearings to the outer case.

8. A robot hand comprising:

a base module; and at least two finger modules comprising:

a first link module rotating around a first joint shaft provided on the base module;

a first drive module having a first drive motor fixed to the first link module for driving and rotating the first link module around the first joint shaft, first reduction means for reducing a rotation of the first drive motor, and first output means connected to the first link module for outputting the reduced rotation of said first drive motor;

a second drive module having a second drive motor fixed to the first link module, second reduction means for reducing a rotation of the second drive motor, and second output means for outputting the reduced rotation of said second drive motor;

a third drive module having a third drive motor fixed to the first link module, third reduction means for reducing a rotation of the third drive motor, and third output means for outputting the reduced rotation of said third drive motor;

a second link module driven and rotated around a second joint shaft provided in the first link module by second driven means engaging with the second output means of the second drive module; and a third link module driven and rotated around a third joint shaft provided in the second link module by third driven means engaging with the third output means of the third drive module, and said at least two finger modules being placed side by side on said base module for freely holding an object by means of the finger modules, wherein all of said link modules are driven and rotated through gear means by said drive module.

9. A robot hand according to claim 8, wherein:
the first joint shaft is inclined with respect to the base module.

10. A robot hand according to claim 8, wherein:
the first joint shaft is provided on the base module perpendicularly thereto.

11. A robot hand according to claim 8, wherein:
the first joint shaft is provided on the base module horizontally thereto.

12. A robot hand according to claim 8, wherein:
said base module is fixed to a robot and provided with each of said finger modules being disposed at an interval to each other.

13. A robot hand according to claim 12, wherein:
said each finger module is fixed to the base module in a radial direction at an interval of 120°.

14. A robot hand according to claim 13, wherein:
in said each finger module, the first and second link modules are constructed by V-shaped members, the third link module comprises a straight member, the first joint shaft is provided as being inclined to the base module, the second joint shaft is provided perpendicularly to the first joint shaft, and the third joint shaft is provided in parallel to the second joint shaft.

15. A robot hand according to claim 13, wherein:
in said each finger module, the first, second and third link modules comprise straight members, the first joint shaft is provided perpendicularly to the base module, the second joint shaft is provided perpendicularly to the first joint shaft, and the third joint shaft is provided in parallel to the second joint shaft.

16. A robot hand according to claim 13, wherein:
in said each finger module, the first, second and third link modules comprise straight members, the first joint shaft is provided horizontally to the base module, the second joint shaft is provided perpendicularly to the first rotating shaft, and the third joint shaft is provided in parallel to the second joint shaft.

17. A robot hand according to claim 12, wherein:
said at least two finger modules are provided in the same direction and in parallel with each other and at least one further finger module is provided in an opposite direction to said at least two finger modules and in parallel with each other in the base module.

18. A robot hand comprising:

a base module; and a plurality of finger modules mounted on said base module;

wherein each finger module comprises:

a first link module supported on said base module rotatably around a first joint shaft;

a second link module supported on said first link module rotatably around a second joint shaft and perpendicularly to a plane including said first joint shaft;

a third link module supported on said second link module rotatably around a third joint shaft in parallel with said second joint shaft;

first, second and third drive means provided on said first link module; and first, second and third drive transmission means comprising gear means for rotating said first, second and third link modules around the respective joint shafts by drive force of said first second and third drive means.

* * * * *